United States Patent [19]

Wolfe

[11] 4,068,537
[45] Jan. 17, 1978

[54] SHIFT CONTROL SYSTEM FOR A MULTIPLE INPUT TRANSMISSION

[75] Inventor: Robert W. Wolfe, Jackson, Mich.
[73] Assignee: Clark Equipment Company, Buchanan, Mich.
[21] Appl. No.: 731,391
[22] Filed: Oct. 12, 1976
[51] Int. Cl.² ............................................. G05G 5/10
[52] U.S. Cl. ........................................ 74/477; 74/360; 91/22
[58] Field of Search ................... 74/360, 477; 91/22
[56] References Cited

U.S. PATENT DOCUMENTS

| | | | |
|---|---|---|---|
| 2,226,660 | 12/1940 | Eaton et al. | 74/334 |
| 2,297,026 | 9/1942 | Sanford et al. | 74/346 |
| 2,847,871 | 8/1958 | Schick | 74/477 |
| 2,943,500 | 7/1960 | Wittren | 74/334 |
| 2,943,719 | 7/1960 | McNamara et al. | 192/3.5 |
| 2,974,766 | 3/1961 | Perkins et al. | 192/3.5 |
| 3,039,320 | 6/1962 | Zens et al. | 74/334 |
| 3,229,551 | 1/1966 | Stuckey | 74/477 X |
| 3,422,939 | 1/1969 | Biabaud | 192/3.5 |
| 3,795,153 | 3/1974 | Seilly | 74/335 |
| 3,941,007 | 3/1976 | Webber et al. | 74/340 |

Primary Examiner—Allan D. Herrmann
Attorney, Agent, or Firm—Ernst H. Ruf

[57] ABSTRACT

In combination with a transmission having a multiple input portion and a multiple output portion, each of which contains a plurality of speed change gears, is a shift control system having a plurality of fluid-pressure operated actuators that respond to movement of a preselector valve control member having a plurality of positions that correspond to separate ones of the drive ratios. Shift sensing means produce a first signal upon movement of the preselector valve control member whereas neutral position sensing means produce a second signal upon movement to neutral of the transmission input portion. A neutral sequence valve has a movable spool member maintainable in first and second alternate positions in response to the first and second signals, with mechanical interlock means, associated with the actuators, locking the transmission output portion in gear whenever the transmission input portion is in gear and locking the input portion in neutral whenever the output portion is in neutral. Details of the mechanical interlock means as well as shifting and interlocking methods are also set forth.

20 Claims, 22 Drawing Figures

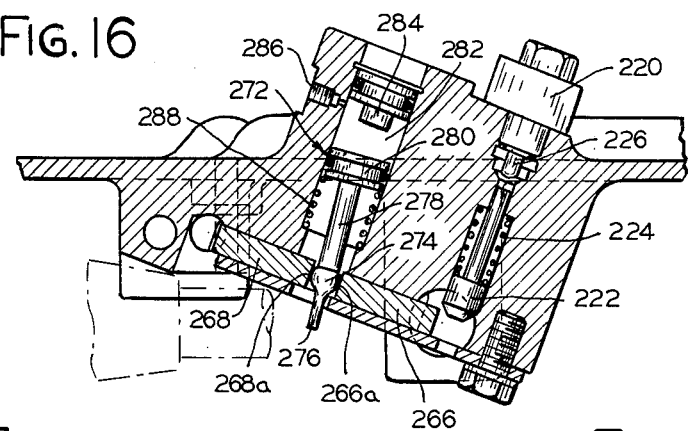

I, II, III = 1ˢᵀ, 2ᴺᴰ, 3ᴿᴰ INPUTS
i, ii, iii = 1ˢᵀ, 2ᴺᴰ, 3ᴿᴰ OUTPUTS
F = FWD    R = REV
N1-PTO = 1ˢᵀ PTO SPEED
N2-PTO = 2ᴺᴰ PTO SPEED

FLUID CHAMBERS

| VALVE POSITION | 180 | 184 | 198 | 202 | 156 | 160 | 146 |
|---|---|---|---|---|---|---|---|
| R | P | X | P | P | P | X | P |
| N1 PTO | P | P | P | P | P | X | P |
| N2 PTO | P | P | P | P | X | X | X |
| 1 | X | P | P | P | P | X | P |
| 2 | P | P | X | P | P | X | P |
| 3 | P | P | P | X | P | X | P |
| 4 | X | P | P | P | X | X | X |
| 5 | X | P | P | P | P | P | X |
| 6 | P | P | X | P | X | X | X |
| 7 | P | P | X | P | P | P | X |
| 8 | P | P | P | X | X | X | X |
| 9 | P | P | P | X | P | P | X |

P = PRESSURE
X = EXHAUST
N1-PTO = 1 PTO SPEED
N2-PTO = 2 PTO SPEED

SHIFT CONTROL SYSTEM FOR A MULTIPLE INPUT TRANSMISSION

BACKGROUND OF THE INVENTION

1. Field of the Invention

The field of art to which this invention pertains includes a shift control system in combination with a transmission having a multiple input portion and a multiple output portion, each of which in turn contains a plurality of constant-mesh change speed gears to provide for a plurality of drive ratios in response to movement of the operator's shift lever or the like.

2. Description of the Prior Art

U.S. Pat. No. 4,000,662, issued on Jan. 4, 1977, which is also assigned to the assignee of the present invention, discloses a highly advantageous form of transmission having a basic structure which provides axially aligned input and output shafts together with a single aligned countershaft as well as first, second and third input gears and a plurality of forward output gears with one of the forward output gears also being capable of serving as one of the input gears. First, second and third driven countershaft gears are in constant mesh with respective ones of the input gears and each one of a plurality of driving countershaft gears is in constant mesh with a separate one of the forward output gears, with one of the driving countershaft gears also being capable of serving as one of the driven countershaft gears. Multiple clutch means are utilized for selectively drivably connecting the countershaft with one of the input gears and for selectively drivably connecting the output shaft with the countershaft.

The multiple use of most of the gears of this transmission together with the triple input feature and the single countershaft permits utilization of a transmission housing that has but two through bores, and in one embodiment, all of the components for a nine speed forward and three speed reverse transmission can be located completely within a standard five speed forward-one speed reverse transmission housing.

The multiple use of the gears of this transmission, requires a sophisticated shift control system, especially if this system is of the preselector or semi-automatic type wherein shifts between drive ratios are made in response to the movement of an operator's shift lever and the release of the torque on the drive train.

Related prior art transmissions and control systems therefore are described in U.S. Pat. Nos. 2,974,766; 2,297,026; 2,943,719; 2,943,500; 2,226,660; 3,039,320; 3,422,939; 3,795,153; and 3,941,007.

SUMMARY OF THE INVENTION

This invention provides a control system for shifting a multiple-input multiple-output constant-mesh transmission in response to a simple movement of an operator's control lever or the like to provide for a plurality of separate drive ratios.

More particularly, the invention provides a shift control system in combination with a transmission having a multiple input portion and a multiple output portion, each of which in turn contains a plurality of speed change gears to provide for a plurality of drive ratios. The control system includes a movable control member for a preselector valve havng a plurality of positions, each of which corresponds to a separate one of the drive ratios and has a shift sensor valve associated therewith for producing an input signal upon movement of the preselector control member. A neutral sequence valve has a movable spool member maintainable in first and second alternate positions, with the neutral sequence valve being fluidically interconnected, on one end, with the shift sensor valve for moving the spool member to one of the first and second positions in response to the input signal. A plurality of fluid-pressure actuated motor means is shiftable between at least two predetermined positions so as to couple and de-couple predetermined ones of the speed change gears, with the motor means associated with the transmission input portion being fluidically interconnectable with the preselector valve via the neutral sequence valve, and the motor means associated with the transmission output portion also being fluidically interconnected with the preselector valve. Mechanical interlock means are associated with the motor means to lock the transmission output portion in gear whenever the transmission input portion is in gear and to lock the transmission input portion in neutral whenever the transmission output portion is in neutral. A neutral sensing valve is associated with the interlock means and is fluidically interconnected with another end of the neutral sequence valve for producing a neutral position signal upon movement to neutral of the transmission input portion, with the spool means being movable to the other of the first and second positions in response to the neutral position signal.

The fluid-pressure operated motor means of the shift control system has a plurality of shift rails actuating the plurality of speed change gears. The mechanical interlock structure, combined with the shift control system for a specific transmission, includes a pair of axially aligned input shift rail interlock pins that are adapted to axially abut and slide in unison so that one of the interlock pins coacts with one of a pair of first and second input shift rails and locks one of the shift rails in neutral and is also adapted to axially separate and slide divergingly so that the pair of interlock pins coacts with both the first and second shift rails to thereby lock the shift rails in neutral. An output shift rail interlock pin is adapted to alternately coact with one of a pair of third and fourth transmission output shift rails to lock one of these output shift rails in neutral whereas a pair of axially aligned output shift rail locking pins is adapted to have one or the other of each locking pin slide divergingly so as to alternately coact with another of the output shift rails thereby locking the shift rails in gear. In another mode of operation, this pair of axially aligned output shift rail locking pins is adapted to axially abut, thereby unlocking the other output shift rail. Input-to-output interlock means, coacting with the input shift rail interlock pins and the output shift rail locking pins, prevent the shifting of the third and fourth shift rails out of gear until the first and second shift rails are in the neutral position and to also prevent the shifting of the first and second shift rails out of the neutral position until one of the third and fourth shift rails have been coupled to the predetermined gear. The input-to-output interlock means can take the form of a single pin or, if P.T.O. operation is desired, takes the form of a pair of input-to-output pins having an interlock override valve means interposed therebetween.

Further set forth in the specification are methods for shifting the transmission from one drive ratio to another and for interlocking the various shift rails.

The principal objects, features and advantages of this invention will be more readily understood by persons skilled in the art when following the detailed description in conjunction with the several drawings.

BRIEF DESCRIPTION OF THE DRAWINGS

FIG. 16 is a section taken generally along line 16—16 of FIG. 17.

FIG. 17 is a fragmentary view of a portion of the mechanical interlock structure of FIG. 1 in the neutral position.

FIG. 18 shows another operative position of the structure of FIG. 17.

FIG. 19 shows yet a further operative portion of the structure of FIG. 17.

FIG. 20 is another embodiment of the mechanical interlock structure of FIG. 1 as shown in the neutral position.

Figure 1:
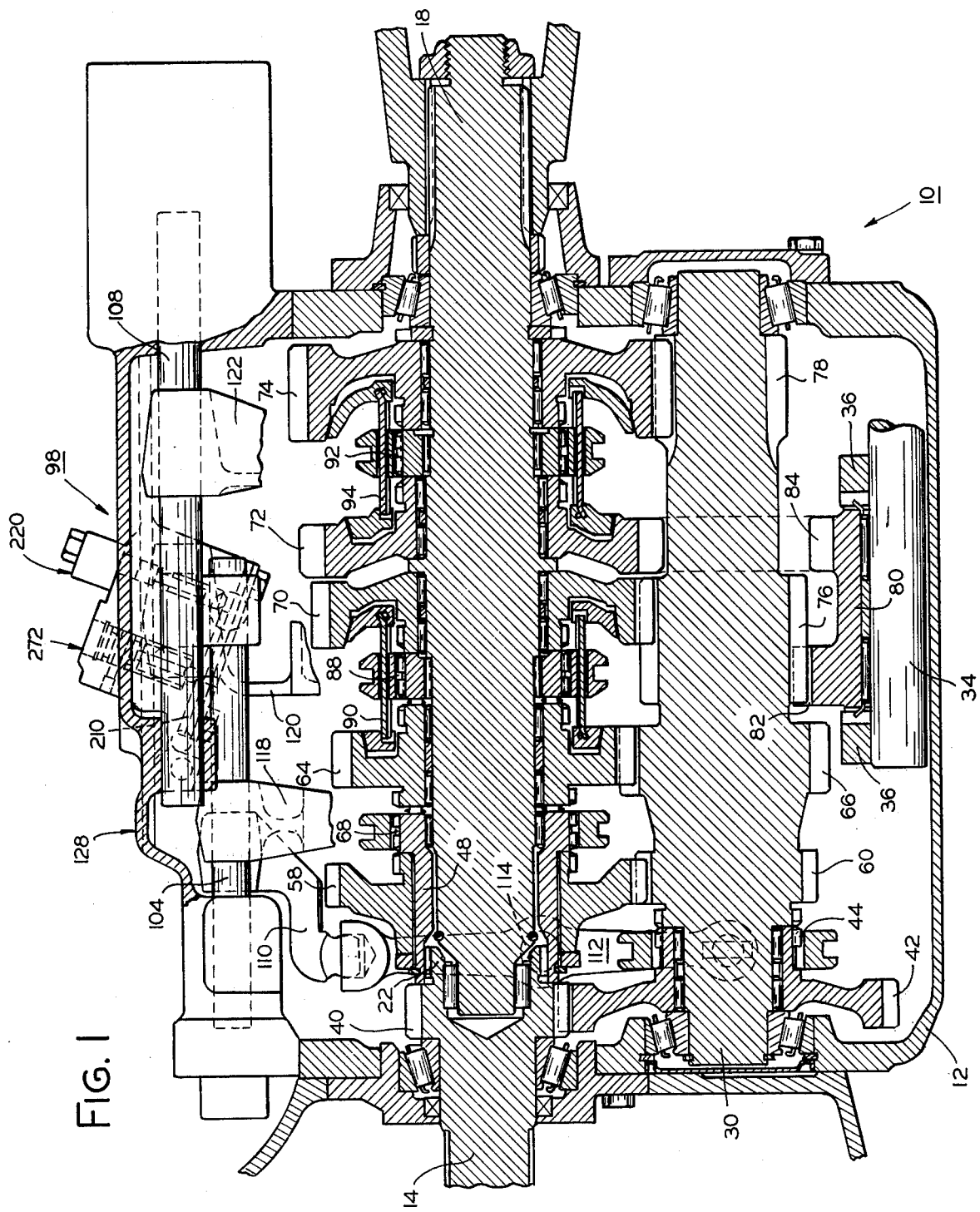
FIG. 1 illustrates a multiple input-multiple output transmission to which the shift control system of this invention may be applied.

It should be understood that while certain terminology will be used in the following description, its use is for convenience in reference only and will not be limiting. The words "right" and "left" will designate directions in the drawings to which the reference is made.

DESCRIPTION OF THE PREFERRED EMBODIMENTS

Referring now to the drawings in detail, the specific transmission 10, shown in combination with the shift control system of this invention, is substantially identical to U.S. Pat. No. 4,000,662, isued on Jan. 4, 1977, which is also assigned to the assignee of this invention. For ease of understanding, however, the structure and function of transmission 10, which has a plurality of constant-mesh change speed gears, will again be described hereinbelow.

Transmission 10 includes a casing or housing 12, an input shaft 14 rotatably journalled therein, an output shaft 18 axially aligned with the input shaft and rotatably journalled relative to the input shaft and casing 12. A countershaft 30 is parallel to and aligned with output shaft 18, while a dead shaft 34, parallel to countershaft 30, is fixedly retained in aligned bosses or stub walls 36 in casing 12.

Shaft 14 has a gear 40 affixed thereto or integral therewith, with gear 40 being in constant mesh with a gear 42 rotatably journalled on countershaft 30. A conventional dog clutch 44, incorporating a known clutch lock to prevent jumping out of gear, is disposed on the hub of gear 42 and is arranged either to drivably connect gear 42 to countershaft 30 for conjoint rotation therewith, or to occupy a neutral position as shown in FIG. 1.

Input shaft tubular portion 22, which is adjacent to the inner axial end of gear 40, has either affixed thereto or integral therewith, one end of a sleeve 48 that coaxially surrounds output shaft 18, with sleeve 48 forming an extension of the input shaft.

Rotatably journalled on sleeve 48 is a gear 58 that is in constant mesh with a further gear 60 integral with or affixed to countershaft 30. Rotatably journalled on output shaft 18, adjacent to the inner end of sleeve 48, is a gear 64 that is in constant mesh with a gear 66 integral with or affixed to countershaft 30. Another conventional clutch 68, such as a dog clutch, and also incorporating a clutch lock, is disposed on sleeve 48 between gears 58 and 64 and is arranged either to drivably connect gear 58 to sleeve 48, or to drivably connect gear 64 to sleeve 48, or to occupy a neutral position as shown in FIG. 1. Thus, basically, it is the function of clutch 68 to connect either of gears 58 and 64 for conjoint rotation with input shaft 14 via sleeve 48. Gears 40, 58 and 64, whose pitch circle diameters differ from one another in a well known manner are thus in constant mesh with gears 42, 60 and 66, respectively, with the utilization of clutches 44 and 68 thus providing three separate inputs to single countershaft 30. The portion of transmission 10 described so far may be designated the "input" portion of this transmission.

Also journalled for rotation on output shaft 18 are gears 70, 72 and 74 whose pitch circle diameters differ from one another in a well known manner, with gears 70 and 74 being in constant mesh, respectively, with gears 76 and 78 affixed to or integral with countershaft 30. Gear 76, which has a greater axial extent than gear 70, is also in mesh with a gear 82 affixed to or part of a tubular reverse-idler shaft 80 which in turn is journalled for rotation on dead shaft 34. Gear 72 is in constant mesh with a gear 84 which is affixed to or forms a part of shaft 80.

A conventional clutch 88, such as a dog clutch, and also incorporating a clutch lock and a known synchromesh device 90, is disposed on output shaft 18, intermediate gears 64 and 70, and is arranged to drivably connect either of these two gears to shaft 18 or to occupy a neutral position as shown in FIG. 1. A similar conventional clutch 92, incorporating a clutch lock and a known synchromesh device 94, is disposed on output shaft 18, intermediate gears 72 and 74, and is arranged to drivably connect either of these gears to shaft 18 or to occupy a neutral position as shown in FIG. 1. Basically, gears 64, 70, 72 and 74 together with gears 66, 76, 82, 84 and 78 may be described as constituting the "output" portion of transmission 10. It should be noted that gears 64 and 66 can alternately function both as input and output gears, as will be explained in more detail as the description progresses.

Figure 2:
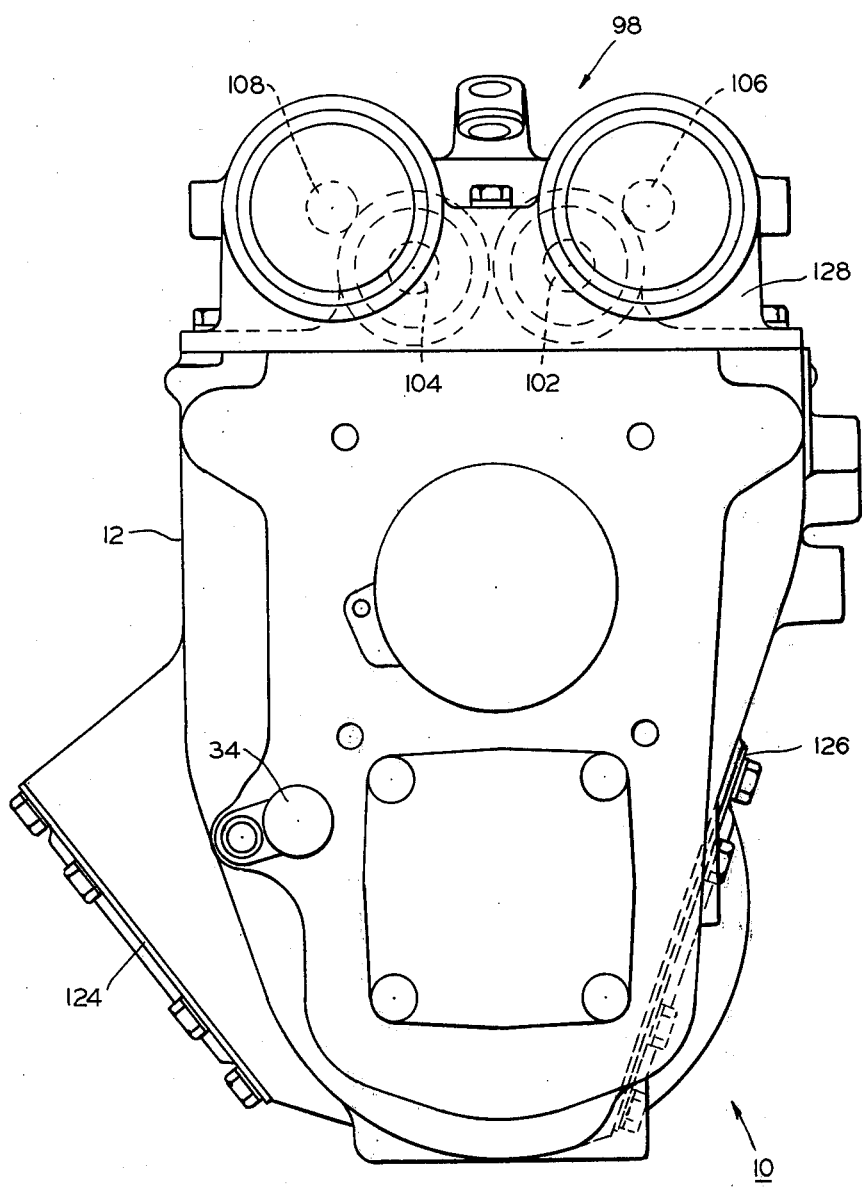
FIG. 2 is a rear end elevation of the transmission shown in FIG. 1.

As best seen in FIG. 2, transmission case or housing 12 is provided with two generally opposed side cover plates 124, 126 that are bolted to housing 12 and removable therefrom to permit the installation of external power takeoff mechanisms (not shown) if so desired.

Once side plates 124 and 126 are removed, the housing openings conform to SAE standard bolt patterns J704a which defines side openings for truck power takeoffs. The removal of cover plate 124 permits the installation of a power takeoff unit which includes a driven gear that can mesh with idler shaft gear 82, whereas the removal of cover plate 126 permits the installation of a power takeoff unit which has a driven gear that can mesh with countershaft gear 66. Since transmission 10 has three inputs, three power takeoff speeds are possible, although not all of them need be utilized. In addition, depending on requirements, either one or both of the power takeoff units can be utilized.

Figures 21, 22:
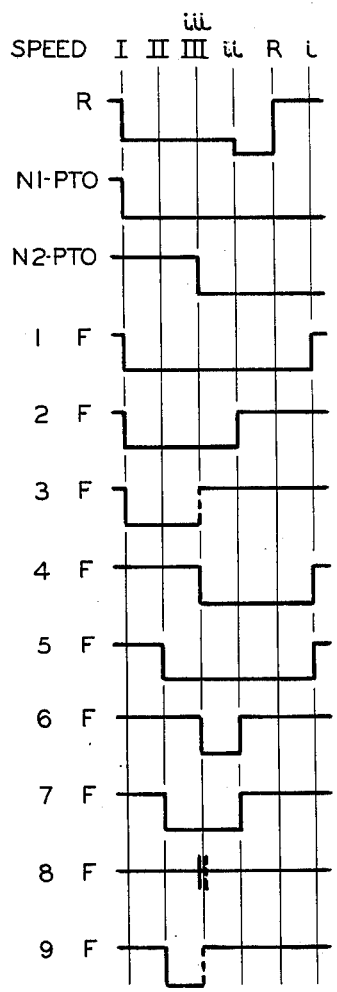
FIG. 21 is a schematic showing of the power paths through the FIG. 1 transmission.
FIG. 22 is a schematic showing of the actuation combinations of the shift control system servo units to achieve the FIG. 21 power paths.

In operation, transmission 10 has nine forward speeds and as many as three reverse speeds, although not all three of the reverse speeds need be utilized. FIG. 21 is a schematic showing of the various power paths through transmission 10 in each of the nine forward and one reverse speeds, with FIG. 21 also showing two P.T.O. speeds. As best seen in FIGS. 1 and 21, transmission 10 can be defined as having a first input via constant mesh gears 40 and 42, the latter being coupled to countershaft 30 via clutch 44, with countershaft 30 rotating in a direction opposite to that ot input shaft 14. A second input is provided by constantly meshing gears 58 and 60, with the former being adapted to be coupled to input sleeve 48 via one of the operative positions of clutch 68, thereby causing rotation of the countershaft in a direction opposite to that of the input shaft. Yet another or third input is provided by constantly meshing gears 64 and 66, with the former being adapted to be coupled to input shaft sleeve 48 via the other operative position of clutch 68, thereby rotating the countershaft in a direction opposite to that of input shaft 14.

A first forward output from transmission 10 can be defined by constantly meshing gears 78 and 74, with the latter being adapted to be coupled to output shaft 18 via one of the operative positions of clutch 92, thereby rotating output shaft 18 in a direction opposite to that of countershaft 30. A second forward output is defined by constantly meshing gears 76 and 70, with the latter being adapted to be coupled to output shaft 18 via one of the operative positions of clutch 88, thereby rotating output shaft 18 in a direction opposite to that of countershaft 30. Yet another or third forward output is defined by constantly meshing gears 66 and 64, with the latter being adapted to be joined to output shaft 18 via another of the operative positions of clutch 88, thereby rotating output shaft 18 in a direction opposite to that of countershaft 30.

A reverse output is provided by constantly meshing gears 84 and 72, with the latter being adapted to be coupled to output shaft 18 via another of the operative positions of clutch 92, thereby rotating output shaft 18 in the same direction as countershaft 20 (and in a direction opposite to that of input shaft 14).

An analysis of FIG. 21 will show that by utilizing the first input (40, 42) together with the first output (78, 74) provides a first forward speed. Continuing the use of the first input but utilizing the second (76, 70) or third (66, 64) outputs will provide second or third forward output speeds. The third input (64, 66) together with the first output provides a fourth forward speed whereas the second input (58, 60) with the first output provides a fifth forward speed. The third input together with the second output provides a sixth forward speed whereas the second input together with the second output provides a seventh forward speed. The third input, which is also the third output, provides an eighth or direct drive by utilizing clutch 68 to couple one side of the hub of gear 64 to input shaft sleeve 48 and by utilizing clutch 80 to couple the other side of the hub of gear 64 to output shaft 18. A ninth forward speed is provided by utilizing the second input together with the third output.

Three reverse speeds are available by coupling either the first, second or third inputs to the reverse output (84, 72). As previously noted, while three reverse output speeds are possible, it is, of course, not necessary that all three of these speeds be utilized, and as will become clear as this description progresses, only one reverse output speed will be utilized.

Another way of defining the structure and function of transmission 10 is, as best seen in FIG. 21, that the first input is utilized in the first, second and third speeds forward as well as reverse speed and the first power takeoff speed. The second input is utilized for the fifth, seventh and ninth speeds forward. The third input is utilized for the fourth, sixth and eighth speeds forward as well as the second power takeoff speed. The first output is utilized for the first, fourth and fifth speeds forward whereas the second output is utilized for the second, sixth and seventh speeds forward. The third output is utilized for the third, eighth and ninth speeds forward while the reverse ouput is utilized for the reverse speed. While one or both of the power takeoffs may be operated when there is an output connection to the output shaft, these power takeoffs may also be operated when there is no connection to the output shaft, i.e., when the vehicle is at rest.

While transmission 10 has three inputs and three forward outputs, it should be noted that when changing from first to second, second to third, fourth to fifth, sixth to seventh and eighth to ninth speeds forward, only one clutch has to be disengaged and one other clutch has to be engaged, whereas in shifting from third to fourth, fifth to sixth and seventh to eighth speeds forward, two clutches must be disengaged and two other clutches must be engaged.

Figure 3:
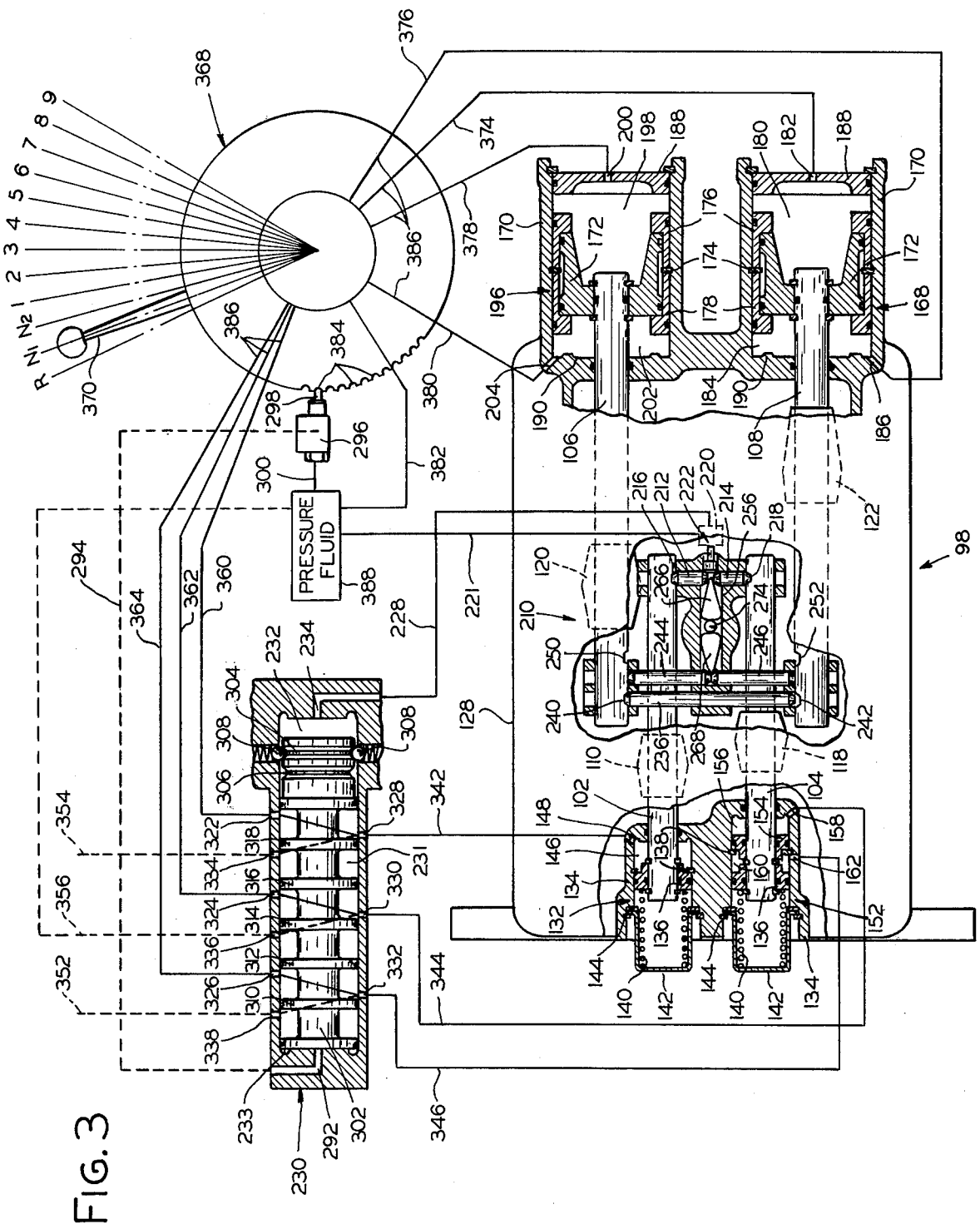
FIG. 3 is a top plan view, partly in section and partly schematic, of the shift control system in a neutral position.

A shift control system, generally designated by numeral 98 and best seen in FIGS. 1 and 3, for selecting any of the available power paths through the transmission, includes four shift rails or selector rods 102, 104, 106 and 108. All four of these selector rods are parallel and adjacent to one another, with shift rail 102 being attached to one end of a lug member 110 whose other end is pivotally connected with a shift fork 112 (FIG. 1) which in turn is pivotally connected to casing 12 at 114. Shift fork 112 operatively engages clutch 44 and operates it in the manner previously described. Shift rails 104, 106 and 108 carry selector or shift forks 118, 120 and 122, respectively, that operatively engage respective clutches 68, 88 and 92. In the interest of simplicity and in order to avoid confusion, the engagement of shift forks 112, 118, 120 and 122 with clutches 44, 68, 88 and 92, respectively, is not shown, but is accomplished in a manner well known in the art and is shown in the previously-referred to co-pending application.

Shift rails 102, 104, 106 and 108 are axially slidably retained in bores in shift control cover housing 128 which is removably secured to the top of transmission housing 12. The shift system portion of control system 98 includes a first fluid motor 132 comprising a cylinder 134, a piston 136 affixed to one end of selector rod 102, a piston stop ring 138, a piston return spring 140, a cylinder end cover 142 having a piston abutment portion 144, a chamber 146 and a fluid port 148.

Motor or actuator 132, which may also be designated the 1 input motor, in the absence of pressure fluid in cavity 146 has its piston 136 in abutment with stop ring 138 due to the bias of spring 140. In this position, clutch 44 is in the neutral position shown in FIG. 1, whereas when pressure fluid is supplied to chamber 146, piston 136 is displaced against spring 140 until the former abuts cover portion 144, in which position clutch 44 couples gear 42 to countershaft 30 for conjoint rotation therewith.

Another fluid motor or actuator 152, which may also be designated the 2-3 input motor, is very similar to previously-described fluid motor 132, with like numerals being applied to like parts. In addition to piston 136 which is affixed to one end of selector rod 104, rod 104 also has a further piston 154 slidably mounted thereon, with stop ring 138 being intermediate fixed piston 136 and slidable piston 154. Furthermore, motor 152 has a first fluid chamber 156 with a first fluid port 158, and a second fluid chamber 160 with a second fluid port 162, with port 162 being located intermediate piston 136 and stop ring 138. In operation, with no pressure fluid in either of chambes 156 and 160, spring 140 will bias piston 136 against stop ring 138, in which position clutch 68 will drivably connect third input gear 64 to input shaft sleeve 48 for conjoint rotation therewith. Applying fluid pressure only to chamber 156 will cause abutment of piston 154 with stop ring 138, in which position clutch 68 will be in the neutral or rest position shown in FIG. 1. When pressure fluid is supplied to both chambers 156 and 160, piston 136 will be displaced against the bias of spring 140 until the former abuts cover portion 144, in which position clutch 68 is arranged to drivably connect input gear 58 to input shaft sleeve 48 for conjoint rotation therewith.

The shift control system further includes another fluid motor or actuator 168 which includes a cylinder 170, a piston 172 attached to selector rod 108, a piston stop ring 174, a first piston slipper 176, a second piston slipper 178, a first fluid chamber 180 with a first fluid port 182, a second fluid chamber 184 with a second fluid port 186, a cylinder end cover 188 and a cylinder inner end surface 190. As shown in FIG. 3, piston 172 rides with one and slides with reference to the other one of piston slippers 176 and 178 so that when pressure fluid is supplied solely to first fluid chamber 180, piston 172 and slipper 178 will be displaced to the left until the latter abuts cylinder inner end surface 190 in which position clutch 92 is arranged to drivably connect output shaft reverse gear 72 to output shaft 18 for conjoint rotation therewith. Supplying pressure fluid solely to fluid chamber 184 will axially displace piston 172 and slipper 176 to the right until the latter abuts cylinder outer end cover 188, in which position clutch 92 is arranged to drivably connect first forward output gear 74 to output shaft 18 for conjoint rotation therewith. By supplying pressure fluid to both fluid chambers 180 and 184, fluid motor 168, which may also be designated as the 1-reverse output motor, moves clutch 92 to its neutral position shown in FIG. 1.

Also contained in control cover housing 128 is yet a further fluid motor or actuator 196, which also may be designated as the 2-3 output motor and which is substantially similar to previously-described fluid motor 168, with like numerals applying to like parts. Piston 172 is attached to selector rod 106 and a first fluid chamber 198 has a first fluid port 200, whereas second fluid chamber 202 has a second fluid port 204. Supplying pressure fluid only to chamber 198 will axially displace piston 172 and slipper 178 until the latter abuts cylinder inner end surface 190, in which position clutch 88 is arranged to drivably connect third output gear 64 (which is also the third input gear) to output shaft 18 for conjoint rotation therewith. Similarly, supplying pressure fluid only to chamber 202 will axially displace piston 172 and slipper 176 until the latter abuts cylinder end cover 188, in which position clutch 88 is arranged to drivably connect second output gear 70 to output shaft 18 for conjoint rotation therewith. When pressurized fluid is supplied to both chambers 198 and 202, slippers 176 and 178 abut stop ring 174 which will result in the movement of clutch 88 to the neutral position shown in FIG. 1.

Based on the previous discussion, it should be understood that a first power takeoff speed ratio (FIG. 21) can be obtained by supplying pressure fluid to all fluid chambers (FIG. 22) associated with the four fluid motors 132, 152, 168 and 196, except for fluid chamber 160 in fluid motor 152, which results in the movement of all clutches to their neutral position except for clutch 44 which is arranged to couple first input gear 42 to the countershaft. A second power takeoff speed can be obtained by pressurizing all of the fluid chambers in motors 168 and 196 and exhausting all of the fluid chambers associated with motors 132 and 152, which results in the neutralizing of all clutches except for clutch 68, with clutch 68 being arranged to drivably connect third input gear 64 to the input shaft and thereby turning countershaft 30 via gear 66. Since there is no driving connection between the countershaft and the output shaft in either of the previously-mentioned power takeoff speeds, the transmission can be considered to be in neutral, even though there is an input to the countershaft so as to enable operation of one or both of the power takeoff units, since the vehicle cannot be driven by the transmission.

In order to get the proper sequencing and movement of selector rods 102, 104, 106 and 108, the shift control system of this invention is provided with an interlock structure generally designated by numeral 210. The basic function of interlock structure 210, about to be described, is to prevent the "output" portion of transmission 10 (gears 64, 70, 72 and 74 together with gears 66, 76, 82, 84 and 78) from going to neutral before the "input" portion (gears 40, 58 and 64 together with gears 42, 60 and 66) goes to neutral and to prevent the "input" portion from going into gear before the "output" portion goes into gear. Another way of describing this function is that the "output" portion is locked in gear whenever the "input" portion is in gear and the "input" portion is locked in neutral whenever the "output" portion is in neutral.

Mechanical intelock structure 210 (best seen in FIG. 4), which is contained in bores in control cover housing 128, includes a pair of transversely slidable input rail interlock pins 212 and 214 whose inner ends 212a, 214a can abut or be separated (as will be explained in more detail later) and whose outer ends 212b, 214b are adapted to either abut rails 102, 104 respectively or be operatively received in grooves or notches 216, 218 or rails 102 and 104 respectively, thereby locking these rails against longitudinal movement. If so desired, all pin end portions may be conical, tapered or rounded for easier engagement with their mating surfaces which may be similarly shaped. Furthermore, the pin diameters may be varied so as to suit specific requirements, with, for example, the diameters of pins 212, 214 in FIGS. 17-19 being greater than the diameters of these same pins in other instances. In their abutted mode, the combined length of pins 212 and 214 is greater than the transverse spacing between selector rods 102 and 104 so that one of pins 212 and 214 must have its outer end received in one of the selector rod notches. Similarly, in order to permit the separation or spreading of pin inner ends 212b, 214b, selector rods 102 and 104 must have their grooves transversely aligned (FIG. 5) so that pin outer ends 212b, 214b can be simultaneously received therein, in which positions input rails or rods 102, 104 are locked against axial movement and their associated clutches 44 and 68 are locked in their neutral positions. Abutting the outer surface portions of pin inner ends 212a, 214a is an end portion of a sensor pin 222 of neutral sensor valve 220, with valve 220 being sensitive to the movement of pin ends 212a, 214a. Thus, valve 220 senses whether or not pins 212 and 214 abut or are separated. The structure of neutral sensor valve 220, which is best shown in FIGS. 1 and 16, thus includes sensor pin 222 which is spring biased, via spring 224, into engagement with pin inner ends 212a, 214a. Valve 220 (which is of a well known construction having a control port, a pressure supply port, and an exhaust port) has an operating stem 226 actuated by sensor pin 222. The control port of valve 220 (schematically shown in FIG. 3) is fluidically interconnected, via conduit 228 (FIG. 3), with port 234 of a shuttle or neutral sequence valve 230 which will be discussed in more detail later. Valve 220 is also fluidically interconnected, via conduit 221, with a source of fluid pressure that is schematically shown at 388 and supplies pressure fluid for the entire control system 98.

Interlock structure 210 also includes a single transversely slidable output rail interlock pin 236 whose one end portion 236a is adapted to be engaged in outer groove or notch 240 in output rail or selector rod 106. Alternately, the other end 236b of pin 236 is adapted to be engaged in outer groove 242 in output rail 108. It is the function of pin 236 to alternately lock one of rails 106 and 108 against axial movement, with the clutch associated with the locked rail (either clutch 88 or 92) being in the neutral position.

Parallel with pin 236 is a pair of output rail locking pins 244 and 246. The axial extent of pins 244 and 246 is such that when their inner ends 244a and 246a abut (FIG. 5), their outer ends 244b and 246b can freely contact the surfaces of rails 106 and 108 respectively.

When pin inner ends 244a and 246a are separated, in one instance, pin outer end 244b is adapted to be received either in outer groove 240 in rail 106 (FIG. 7) or in inner groove 250 (FIG. 8), with these positions corresponding to the engagement of clutch 88 with gears 70 and 64 respectively. In either of these positions, opposite shift rail 108 is locked against axial movement by pin 236.

When locking pins 244 and 246 are spread apart and when pin 244 abuts the surface of selector rod 106, then pin outer end 246b is received either in outer groove 242 in shift rail 108 (FIG. 4) or in inner groove 252 (FIG. 15) in shift rail 108, in which positions, clutch 92 is engaged with gears 72 and 74 respectively. In these positions, opposed shift rail 106 is held against axial movement by the engagement of interlock pin 236 and shift rail groove 240.

Turning now to interlock structure 210a in FIG. 20, it will be seen that a single input-to-output interlock pin 258 is loosely contained within control cover housing slot 256. Interlock pin 258 has one end portion 260 in contact with portions of interlock pin inner ends 212a and 214a while another end 262 of interlock pin 258 is in contact with portions of pin inner ends 244a and 244b. The axial extent of interlock pin 258 is so chosen that one of its ends 260 and 262 will force apart either pin ends 212a, 214a or pin ends 244a, 246a. In FIG. 20, pins 212 and 214 are spread apart thereby causing these pins to lock selector rods 102 and 104 respectively against axial movement, thus locking input clutches 44 and 68 in their neutral positions. At the same time, output clutch 88 is in its neutral position. Furthermore, since locking pin 246 is intermediate grooves 242 and 252, output clutch 92 is also in its neutral position. Therefore, interlock 210a in FIG. 20 shows transmission 10 in its full neutral position, i.e., all of the clutches are in their neutral positions, and the only elements in transmission 10 that are rotating are input shaft 14, gear 40 and gear 42, with output shaft 18 and countershaft 30 being nonrotatingly connected to either of the input or output shafts at this time.

Returning now to FIG. 3, interlock structure 210 differs from interlock structure 120a in FIG. 20 in that the single input-to-output interlock pin 258 of the latter is replaced with a pair of oppositely directed input-to-output pins or cam members 266 and 268 (best seen in FIGS. 16 and 17), with the inner ends 266a, 268a, normally being separated by an interposed generally-spherical shaped portion 274 of an interlock override valve generally denominated by numeral 272 (FIG. 16). Outer end portions 266b and 268b of pins 266 and 268, respectively, are designed to spread or separate locking pin ends 244a and 246a (FIG. 4) or separate interlock pin inner ends 212a and 214a (FIG. 5). As long as valve spherical portion 274 is interposed betweeen pins 266 and 268, these pins act in the same manner as previously-described intput-to-output interlock pin 258 utilized in interlock structure 210a (FIG. 20). An analysis of FIGS. 3, 17 and 20 will show that pins 212, 214, 236, 244, 246 and 266, 268 (or 258 in the case of FIG. 20) are arranged so that input selector rods 102 and 104 are locked in neutral and that output selector rods 106 and 108 are also in their neutral positions.

Returning now to FIG. 16, it will be seen that interlock override valve 272 also includes a tail portion 276 merging into spherical portion 274 as well as a rod portion 278 and a piston 280. It is one function of valve tail portion 276 to keep valve spherical portion 274 properly aligned relative to the control cover housing bore that contains pins 266, 268. Piston 280 is loosely contained in valve cavity 282, and in the absence of pressure fluid in cavity 282 (entering via port 286) is spring biased against piston stop member 284. Thus, as long as valve cavity 282 is pressurized and spherical portion 274 of valve 272 is interposed between pins 266 and 268, they operate as a unitary interlock pin. The loose fit of piston 280 in cavity 282 permits the required pivotal movement of spherical portion 274 as pins 266 and 268 are axially moved from a position wherein pins 212 and 214 are separated (FIG. 5 for example) and wherein pins 244 and 246 are separated (FIG. 4 for example).

It should be clear at this time that it is the function of input-to-output interlock pins 266 and 268, when separated by valve spherical portion 274, to assure that selector rods 102, 104, 106 and 108 are shiftable only in the proper sequences. It is the function of interlock structure 210 to prevent the shifting of output rails 106, 108 until input rails 102, 104 are in their neutral position and to prevent the shifting of input rails 102, 104 out of neutral position until output rail 106 or 108 has been shifted into the desired output gear.

Figure 4:
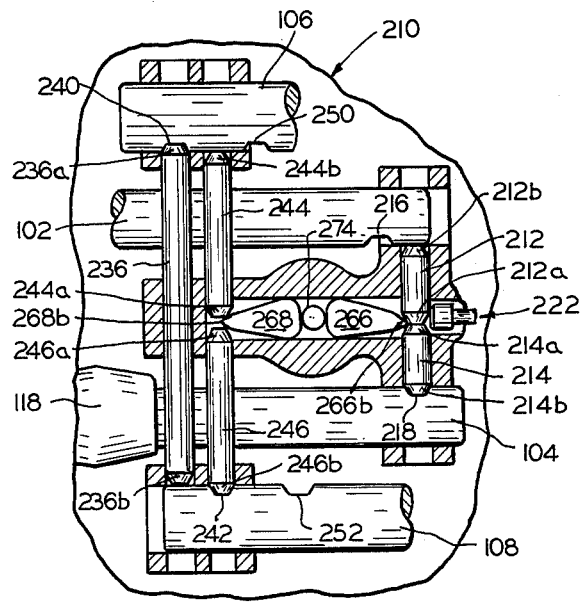
FIG. 4 is a simplified enlarged showing of the mechanical interlock structure of the shift control system in its first gear position.
Figure 5:
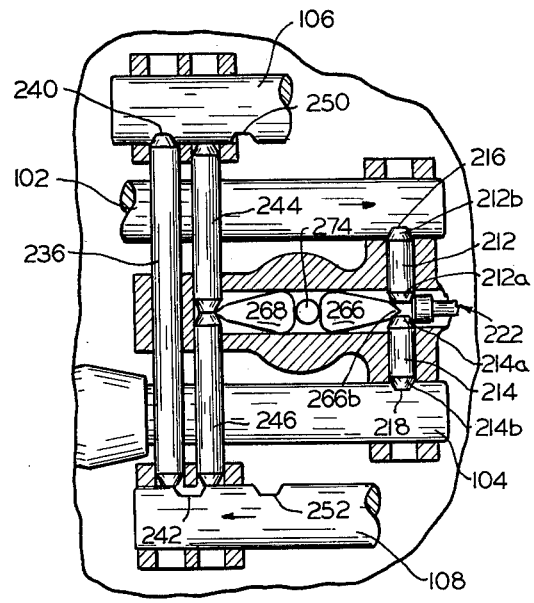
FIGS. 5 and 6 show the mechanical interlock structure of FIG. 4 in operative positions intermediate first and second gear.
Figure 6:
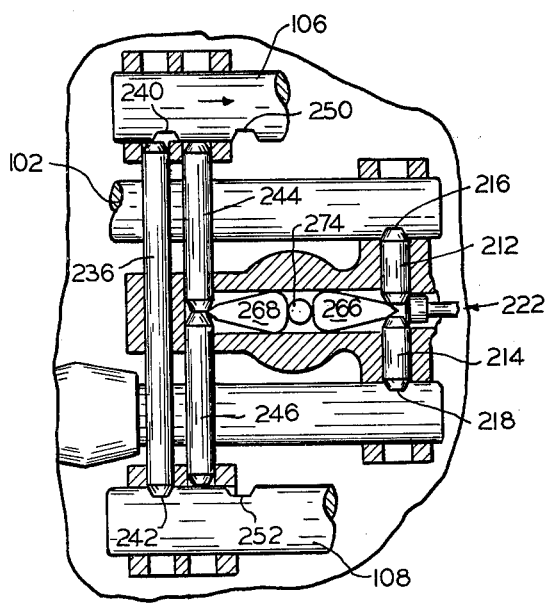
Figure 7:
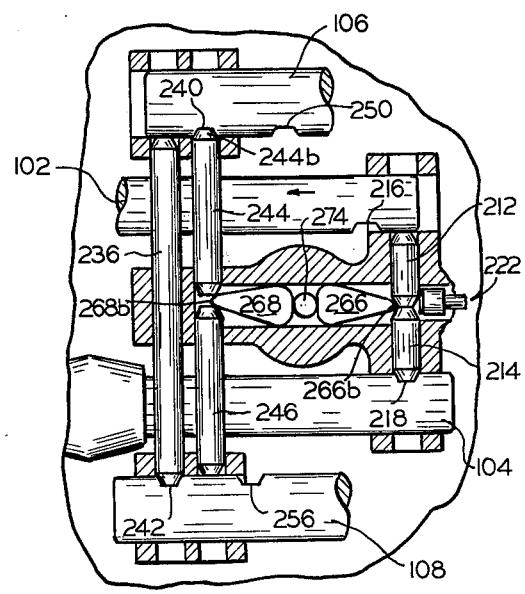
FIG. 7 shows the mechanical interlock structure of FIG. 4 in the second gear position.
Figure 8:
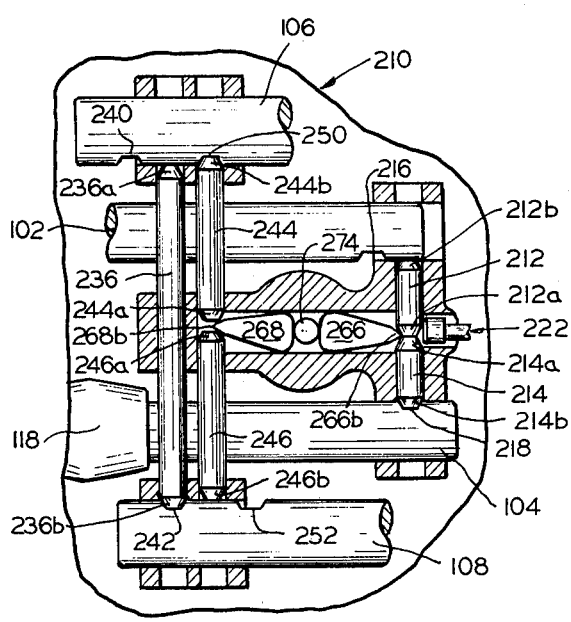
FIGS. 8, 9, 10, 11, 12, 13 and 14 show the mechanical interlock structure of FIG. 4 in the third, fourth, fifth, sixth, seventh, eighth and ninth gear positions respectively.
Figure 9:
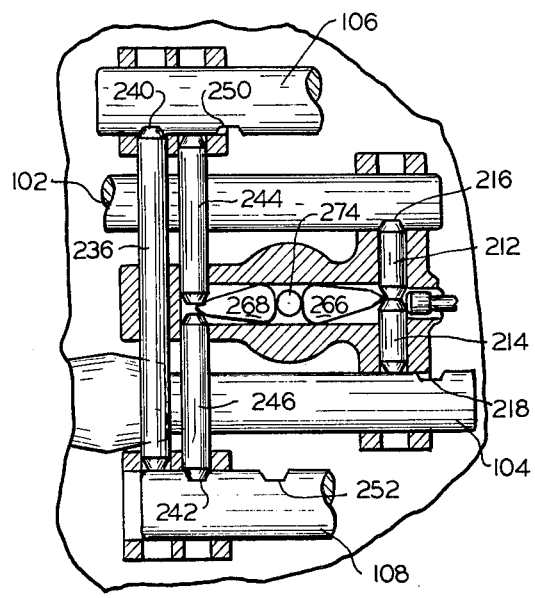
Figure 10:
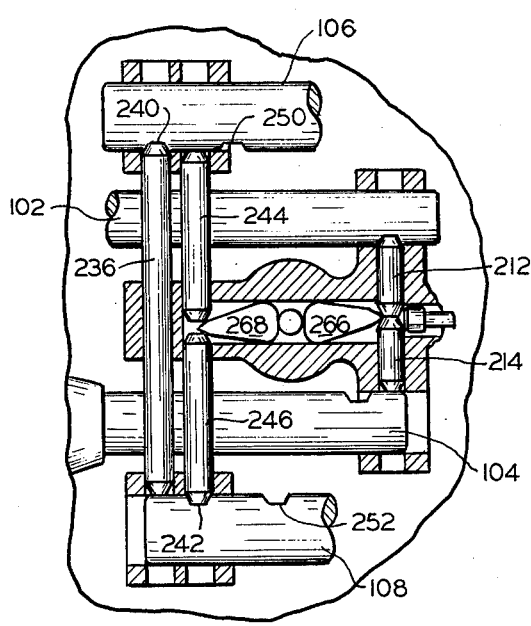
Figure 11:
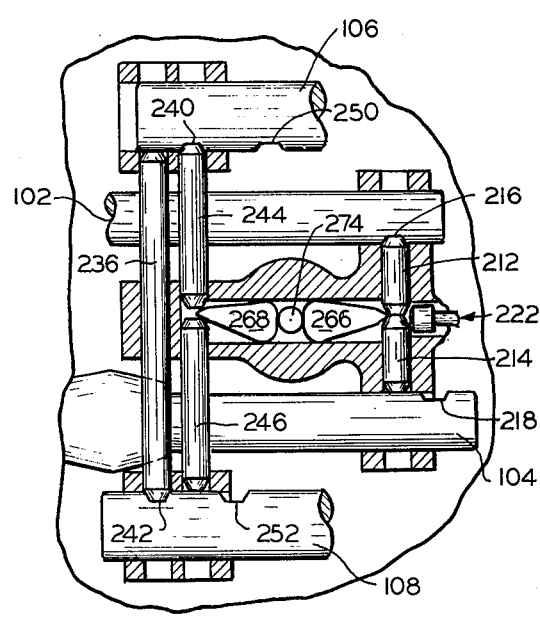
Figure 12:
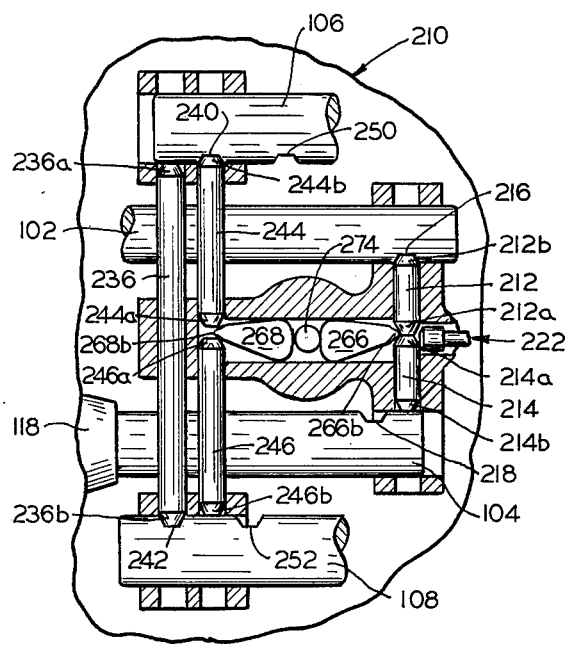
Figure 13:
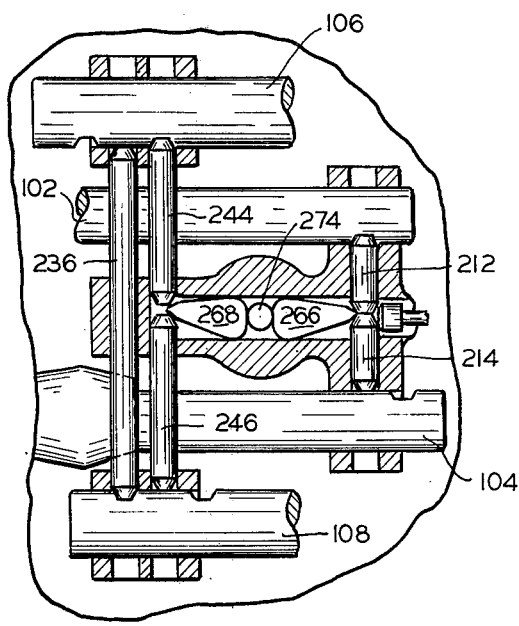
Figure 14:
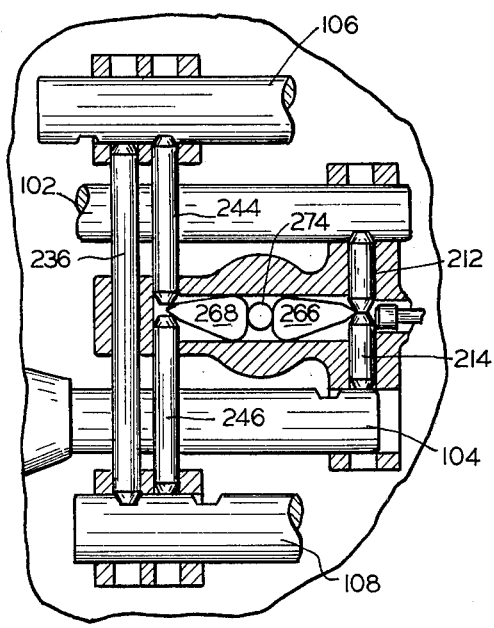

A shift sequence from first to second gear will now be described with reference to FIGS. 4 to 7, with FIG. 4 showing interlock structure 210 in the first gear position whereas FIG. 7 shows the interlock structure in the second gear position, with FIGS. 5 and 6 showing the interlock structure in progressive intermediate positions therebetween. Turning now to FIG. 4, it will be seen that input rail 104 and its associated clutch 68 are locked in the neutral position by pin 214 whereas input rail 102 and its associated clutch 44 are in the first input position. At the same time, output rail 106 and its associated clutch 88 are locked into neutral position by pin 236, whereas output rail 108 and its associated clutch 92 are locked in the first output position. The power flow through transmission 10 and the pressurization or exhausting of the various fluid chambers in the associated fluid motors are graphically shown in FIGS. 21 and 22 respectively. As the operator preselects second gear position (the preselection will be discussed later), the fluid motors are energized to move the "input" portion of the transmission to neutral and the "output" portion to second gear. Rail 106 is urged to the right, rail 108 is urged to the left, and rail 102 is urged to the right. The interlock system permits the following sequence of events: Shift rail 102 is translated to the right until pin 212 enters groove 216 (being urged there by the force, to the left, on rail 108 acting on pin 246, which in turn acts on interlock elements 268, 274 and 266 and finally on 212) and locks rail 102. The movement of pin 212 separates it from pin 214 and pins 268 and 266 together with valve ball portion 274 can then move to the right, with pin portion 266b keeping pins 212 and 214 separated. The movement of pin 268 to the right permits the inward movement of pin 246, thereby unlocking output rail 108 and permitting the leftward movement thereof, as shown in FIG. 5, to the position shown in FIG. 6 wherein it is locked against movement by pin 236 moving into groove 242 (being urged there by the force acting to the right on rail 106), with this movement permitting output rail 106 to move, as shown in FIG. 6, to the FIG. 7 position, wherein pin 244 is lined up (but not yet engaged) with groove 240. Following the movement of rail 102 to the right, neutral sensing valve 220 operates the shuttle valve (to be described later) which now causes rail 102 to be urged back to the left, but it is held by pin 212 until notch 240 in rail 106 lines up with pin 244. Thereafter, input rail 102 can be translated to the left, with this movement forcing pin 212 inwardly against pin 214 and subsequently forcing pins 266, 268 and ball portion 274 axially to the left and consequently forcing pin 244 into groove 240 thereby locking rail 106 in the second output position and moving input rail 102 back to the first input position. An analysis of FIGS. 4 to 7 will show that while the output gearing was shifted from its first to its second position, the input gearing was shifted from its first position into neutral and then back into first position. Thus it should be clear that the input rails have to be locked in neutral before the output rails can be shifted and that the output rails must be shifted and locked before the input rails can be shifted out of neutral.

Figure 15:
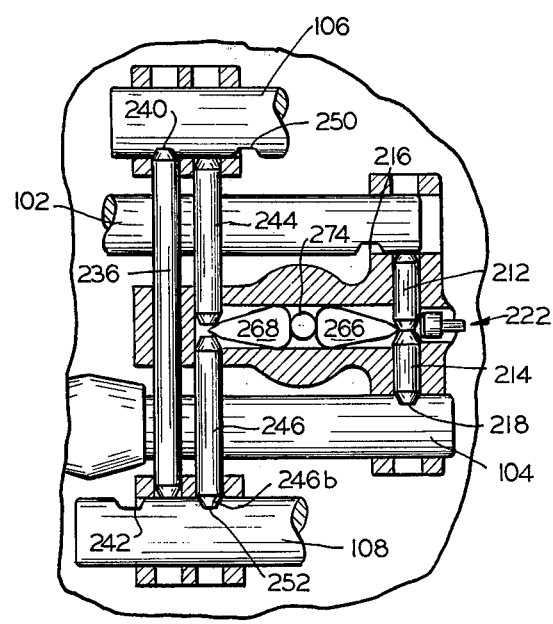
FIG. 15 shows the mechanical interlock structure of FIG. 1 in the reverse position.

As noted, FIGS. 4 and 7 show the interlock structure in its first and second gear positions respectively, with FIGS. 8 through 14 showing the interlock structure in its third through ninth gear positions. FIG. 15 shows the interlock structure in its reverse speed position, with FIGS. 1, 16, 17 and 20 showing the interlock structure in fully neutral position.

As previously noted, as long as spherical portion 274 of interlock override valve 272 is interposed between input-to-output interlock pins 266 and 268, the axial extent thereof is such that one or the other of the inner ends of pins 212, 214 or 244, 246 must be separated (see FIGS. 4 and 5). As shown in FIGS. 17 and 20, in the neutral position, input rail interlock pins 212 and 214 are separated and lock input rails 102 and 104, so that one of output rails 106, 108 must be shifted and locked before one of input rails 102 or 104 can be released from its locked position. However, if it is desired to operate one or both of the power takeoffs while the vehicle is standing still, countershaft 30 must be able to rotate while output shaft 18 must not rotate. Therefore, there must be an input to the transmission, but no output therefrom. This, of course, can be accomplished by permitting output rails 106, 108 to be located in their neutral position while at the same time utilizing one of the inputs to rotate countershaft 30. Interlock structure 210a in FIG. 20, cannot be utilized for P.T.O. operation since it has a single interlock pin 258 which will not allow shifting of the input rails when the output rails are locked in neutral. Thus, in order to permit P.T.O. operation, there must be a way to override input-to-output interlock pin 258. This overriding function can be accomplished in interlock structures 210 (using pins 266, 268 in place of pin 258) by exhausting the pressure from valve cavity 282 of interlock override valve 272 (FIG. 16) so that spring 288 will bias piston 280 against piston stop member 284 and thereby withdraw spherical portion 274 from its position intermediate pins 266 and 268. The withdrawal of spherical portion 274 and the insertion of smaller diameter tail portion 276 permits an axial leftward movement of pin 266 to the extent necessary to permit abutment of pin inner end portions 212a and 214a. This in turn will allow the movement of one or the other of input rails 102, 104 from its neutral position. FIG. 17 shows the interlock structure in its neutral position whereas FIG. 18 shows interlock structure 210 in its first P.T.O. speed position, i.e., output rails 106, 108 and input rail 104 in neutral positions and input rail 102 in its first input position. FIG. 19, similar to FIG. 18, also shows the interposition of only override valve tail portion 276 between pins 266 and 268, with input rail 104 being shown in the third input position which corresponds to the chosen second P.T.O. speed.

Returning now to FIG. 3, it will be seen that shuttle or neutral sequence valve 230 includes a housing bore 231 having a cavity 232 on one end, with cavity 232 being connected via port 234 and conduit 228 with neutral sensor valve 220 (FIG. 16). The other end of housing bore 231 has a valve cavity 233 fluidically connected via port 292 and conduit 294 with shift sensor valve 296.

Slidably movable within bore 231 is a multiple-land spool 302 having first and second detent grooves 304 and 306 that can alternately mate with detents 308 so as to confine spool 302 to two positions of axial movement. Spool 302 has a plurality of spaced land portions 310, 312, 314, 316 and 318, which in one position of spool 302 permit the respective connection between ports 322, 328; 324, 330; and 326, 332, while the other position of spool 302 permit the respective connections between ports 328, 334; 330, 336; and 332, 338. Ports 328, 330 and 332 are connected, via conduits 342, 344 and 346, respectively, with ports 148, 158 and 162, respectively.

Ports 334 and 338 are connected to exhaust conduits 352, 354 respectively, whereas port 336 is connected to pressure fluid conduit 356 leading to fluid pressure source 388. Ports 322, 324 and 326 are fluidically connected, via conduits 360, 362 and 364 respectively, with a manual preselector valve 368, which for the sake of illustration is shown as a rotary valve having a manually operated control handle 370 that is rotatable to a plurality of positions corresponding to the speed ratios of the transmission, which for transmission 10 includes nine forward speeds, one reverse speed and two neutral positions or two P.T.O. speeds. Also connected with the preselector valve 368 are fluid motors 168 and 196, with motor 168 being connected to valve 368 via ports 182 and 186 via conduits 374 and 376, respectively. Fluid motor 196 is connected to valve 368 via ports 200 and 204 via conduits 378 and 380, respectively.

Preselector valve 368, which is connected to fluid pressure source 388 via conduit 382, also has a plurality of detent positions 384 that are adapted to cooperate with plunger 298 of shift sensor valve 296. The particular structure of preselector valve 368 forms no part of this invention and may, for example, take the form of a rotary valve having a plurality of ports 386 that are so arranged as to permit pressurizing and venting in order to accomplish the desired shifting of selector rods 102, 104, 106 and 108 in the manner previously described. FIG. 22 shows the required pressurizing and exhausting of the various fluid motor chambers in each of the desired valve positions. It should be understood that if no P.T.O. operation is required, then the N1 and N2 valve positions will be identical, whereas if P.T.O. operation is desired, then the operator first has to separately exhaust interlock override valve 272 via a separate control (not shown), which could readily be incorporated into valve 368. Thereupon, P.T.O. operation is possible, with the power flow and valve positions therefor being shown in FIGS. 21 and 22. If desired, the control for override valve 272 could be integrated into preselector valve 368 and sensor valve 296 could be similarly integrated thereinto.

Returning now to FIG. 3, as previously noted, neutral sequence valve 230 has two positions that are alternately maintained by detents 308. It is axially moved by a momentary pressure signal on either end of spool 302. One momentary signal to move spool 302 to the "overcontrol" position comes from shift sensor valve 296 which is connected to fluid pressure source 388 via conduit 300. Valve 296 detects the movement of manual preselector valve 368 to a new position, and, as a result of this momentary signal from valve 296, spool 302 is translated to the right thereby connecting ports 334, 328; 336, 330; and 338, 332, which will cause the shifting of input rails 102, 104 to their neutral position and output rails 106, 108 can now be shifted in the manner previously described. Once the output rails have been shifted, interlock pins 244 and 246 can be spread thereby permitting abutment between pins 212 and 214, with this abutment being sensed by valve 220 via sensor pin 222. Thus valve 220 sends a signal to valve 230 and moves spool 302 to the "normal" position which permits the desired actuation of input rails 102 and 104 in the manner called for by valve 368.

The following example will make the operation of shift control system 98 more readily understandable.

a. Assume operation in first gear—see FIG. 4.

b. Assume manual preselector valve control handle 370 is moved from the first to the second gear position. The movement within valve 368 momentarily activates shift sensor valve 296 and therefore neutral sequence valve 230 is axially shifted to overcontrol position, thereby actuating input motor 132 and causing input shift rail 102 to move to and also be locked in neutral position, which in turn separates the pins 244 and 246. See FIG. 5.

c. The separating or unblocking of pins 244 and 246 permits fluid motor 168 to shift output rail 108 from its first output to the neutral position and locking it there via pin 236. See FIG. 6. The previous movement of pin 236 thus frees output rail 106 and fluid motor 196 thereupon shifts it from the neutral to the second output position in which pin 244 enters groove 240 thereby permitting the separation of pins 244 and 246 and the interposition of pin end 268b therebetween. See FIG. 7.

d. The axial movement of pin 268 also permits the axial movement of spherical portion 274 and pin member 266, thereby removing interposed pin end 266b from between pins 212 and 214.

e. The lack of abutment of pins 212 and 214 (see step b, above, and FIG. 5) is sensed by neutral sensor valve 220 which produces a momentary signal to move spool 302 in valve 230 to the left, which movement calls for the actuation of motor 132 and the movement of input shift rail 102 from the neutral to the first input position, the shift being completed following steps c and d, above. See FIG. 7 for the arrangement of interlock structure 210 in the second speed position.

It should be understood that when neutral sequence valve 230 is in its "overcontrol" or right position (dashed lines in FIG. 3), input rail 102 is urged toward neutral but is prevented from going to neutral by engine torque lock on first input clutch 44. Releasing the torque on the drive train (closing of the engine trottle) permits clutch 44 to disengage to neutral thereby permitting input rail 102 and output rail 108 to move to neutral and thus permitting the various interlock or locking pins to return to the neutral position shown in FIGS. 3, 17 and 20. Thereafter output rail 106 can move to the second gear position and interlock pin 236 is forced to interlock output rail 108 in the neutral position. Countershaft 30 slows down as a result of the shift to second, thus desynchronizing low range or first input clutch 44. Since spool 302 has moved back to the left or "normal" position, the porting of manual preselector valve 368 calls for input rail 102 to move to its first input position, which movement intends to engage first input clutch 44. However, since the gear speeds are not synchronous, engagement will not take place until the prime mover has slowed to nearly synchronous speed, after which time engagement is completed and the throttle is again opened for second gear operation. It should be noted that with control system 98, the operator needs a transmission input clutch (not shown) only to start the vehicle from a standing position. Thereafter, the gear positions are preselected and shifting occurs automatically upon manipulation of the throttle by the operator. As previously noted, interlock structure 210a, shown in FIG. 20, shows a unitary input-to-output interlock pin 258, whereas interlock structure 210, as shown in FIGS. 17 and 18 for example, discloses a pair of input-to-output interlock pins 266 and 268 which, when separated by interlock override valve spherical portion 274, do not permit P.T.O. operation, but do permit same upon the interposition of valve tail portion 276 shown in FIGS. 18 and 19.

From the foregoing, it is believed that those familiar with the art will readily recognize and appreciate the novel concepts and features of the present invention. Obviously, while the invention has been described in relation to only a specific transmission embodiment, numerous variations, changes and substitutions of equivalents will present themselves to persons skilled in the art and may be made without necessarily departing from the scope and principles of this invention. As a result, the embodiments described herein are subject to various modifications, changes and the like, without departing from the scope and spirit of the invention. Consequently, the scope of this invention should be determined solely by reference to the claims appended hereto.

What is claimed is:

1. A shift control system in combination with a transmission having a multiple input portion and a multiple output portion each of which in turn contains a plurality of change speed gears to provide for a plurality of drive ratios, said control system comprising:
   a. a movable control member for a preselector valve having a plurality of positions, each corresponding to a separate one of said drive ratios;
   b. first sensing means, associated with said preselector valve, for producing a first signal upon movement of said control member from one to another of said plurality of positions;
   c. a neutral sequence valve including movable means, said movable means being maintainable in first and second alternate positions, said neutral sequence valve being fluidically interconnected, on one end, with said first sensing means for moving said movable means to one of said first and second positions in response to said first signal;
   d. a plurality of fluid-pressure operated actuators, each being shiftable between at least two predetermined positions, to couple and de-couple predetermined ones of said change speed gears, with the actuators associated with said transmission input portion being fluidically interconnectable with said preselector valve via said neutral sequence valve and the actuators associated with said transmission output portion being fluidically interconnected with said preselector valve;
   e. mechanical interlock means associated with said actuators to lock said transmission output portion in gear whenever said transmission input portion is in gear and to lock said transmission input portion in neutral whenever said transmission output portion is in neutral;
   f. second sensing means, associated with said interlock means and fluidically interconnected with another end of said neutral sequence valve, for producing a second signal upon movement to neutral of said transmission input portion, said movable means being movable to the other of said first and second positions in response to said second signal; and
   g. a source of fluid pressure fluidically interconnected with said preselector valve, first sensing means, second sensing means and movable means.

2. The shift control system of claim 1 wherein said plurality of actuators includes first and second motor means associated with said transmission input portion as well as third and fourth motor means associated with said transmission output portion, with each of said motor means including a corresponding shift rail, with said mechanical interlock means interacting with said shift rails and including:
   a. a pair of axially aligned input shift rail interlock pins adapted to axially abut and slide in the same direction so that one of said interlock pins coacts with one of said first and second shift rails and locks said one of said first and second shift rails in neutral, said pair of input shift rail interlock pins also being adapted to axially separate and slide in opposing directions so that said pair of interlock pins coacts with both of said first and second shift rails thereby locking said first and second shift rails in neutral;
   b. an output shift rail interlock pin adapted to alternately coact with one of said third and fourth shift rails and thereby locking said one of said third and fourth shift rails in neutral; and
   c. a pair of axially aligned output shift rail locking pins, with one of said locking pins being adapted to axially slide divergingly so that one of said shift rail locking pins alternately coacts with another of said third and fourth shift rails thereby locking said another of said third and fourth shift rails in gear, said pair of output shift rail locking pins also being adapted to axially abut, thereby unlocking said another of said third and fourth shift rails.

3. The shift control system of claim 2 wherein said mechanical interlock means further includes input-to-output interlock means coacting with said pair of input shift rail interlock pins and said pair of output shift rail locking pins so as to, in the alternative:
   a. locking said first and second input shift rails; and
   b. locking one of said third and fourth shift rails, it being the function of said input-to-output interlock means to prevent the shifting of said third and fourth shift rails until said first and second shift rails are in their neutral position and to prevent the shifting of said first and second shift rails out of neutral position until one of said third and fourth shift rails has coupled a predetermined gear.

4. The shift control system of claim 3 wherein said input-to-output interlock means takes the form of a single input-to-output pin that alternately forces apart the abutting ends of one of said pairs of input shift rail interlock pins and said output shift rail locking pins.

5. The shift control system of claim 3 wherein said input-to-output interlock means includes a pair of input-to-output pins that coact to alternately force apart the abutting ends of one of said pairs of input shift rail interlock pins and said output shift rail locking pins.

6. The shift control system of claim 5 wherein said input-to-output interlock means further includes interlock override valve means interposed between adjacent ends of said pair of input-to-output pins, with withdrawal of a portion of said valve means, when said transmission output portion is in neutral, causing unlocking of one of said first and second shift rails, thus permitting an input to said transmission while still maintaining said third and fourth shift rails in a neutral position.

7. The shift control system of claim 2 wherein said second sensing means includes a sensor valve and a sensor pin, with said sensor pin coacting with said pair of input shift rail interlock pins to determine the axial abutment and separation of said input shift rail interlock pins, with the separation of said input shift rail interlock pins indicating the locking of said first and second shift rails in neutral.

8. The shift control system of claim 2 wherein said neutral sequence valve includes:
   a. a housing having a bore, said bore being connected on one end with said first sensing means and on another end with said second sensing means;
   b. said movable means is sealably disposed and axially slidable within said bore and takes the form of a multiple-land spool;
   c. groove and detent means for confining said spool in first and second alternate positions;
   d. said bore having a plurality of ports that are fluidically interconnected with said preselector valve and said actuators associated with said transmission input portion in a manner such that said first signal moves said multiple-land spool to the first of said alternate positions, wherein said actuators associated with said transmission input portion cause said transmission input portion to move to neutral.

9. The shift control system of claim 8 wherein said plurality of neutral sequence valve ports is so fluidically interconnected with said preselector valve and said actuators associated with said transmission input portion that, when said second signal moves said multiple land spool to the second of said alternate positions, said actuators associated with said transmission input portion move said input shift rails to the position selected via said preselector valve.

10. The shift control system of claim 2 wherein said second shift rail has two gear coupling positions separated by an intermediate neutral position and said fourth shift rail also has two gear coupling positions separated by an intermediate neutral position, said second and fourth shift rails, in one of said gear coupling positions, coupling one of said speed change gears both to the input and output portions of said transmission, with all of said gear coupling positions being forward drive positions.

11. The shift control system of claim 2 wherein said first shift rail has a gear coupling position and a neutral position and said third shift rail has two gear coupling positions separated by an intermediate neutral position, one of said two gear coupling positions being a forward drive position with the other of said two gear coupling positions being a reverse drive position.

12. A mechanical interlock structure, in combination with a transmission shift control system that includes a plurality of fluid-pressure operated motor means having corresponding shift rails, for actuating a plurality of speed change gears in a transmission to provide a plurality of speed ratios, said interlock structure including:
   a. a pair of axially aligned input shift rail interlock pins adapted in one mode of operation to axially abut and slide in unison so that one of said interlock pins coacts with one of a pair of first and second transmission input shift rails and locks said one of said input shift rails in neutral, and in another mode of operation also being adapted to axially separate and slide divergingly so that said pair of interlock pins coacts with both said first and second shift rails to thereby lock said shift rails in neutral;
   b. an output shift rail interlock pin adapted to alternately coact with one of a pair of third and fourth transmission output shift rails thereby locking one of said output shift rails in neutral;
   c. a pair of axially aligned output shift rail locking pins adapted in one mode of operation to have one of said locking pins slide divergingly so that said one locking pin alternately coacts with another of said output shift rails thereby locking said another output shift rail in gear, and in another mode of operation also being adapted to axially abut, thereby unlocking said another output shift rail; and
   d. input-to-output interlock means interposed between and coacting with said input shift rail interlock pins and said output shift rail locking pins to prevent the shifting of said third and fourth shift rails until said first and second shift rails are in their neutral position and to prevent the shifting of said first and second shift rails out of neutral position until one of said third and fourth shift rails has coupled a predetermined gear.

13. The interlock structure of claim 12 wherein said input-to-output interlock means takes the form of a single input-to-output pin that alternately forces apart the abutting ends of one of said pairs of input shift rail interlock pins and said output shift rail locking pins.

14. The interlock structure of claim 12 wherein said input-to-output interlock means includes a pair of input-to-output pins that coact to alternately force apart the abutting ends of one of said pairs of input shift rail interlock pins and said output shift rail locking pins.

15. The interlock structure of claim 14 wherein said input-to-output interlock means further includes interlock override valve means interposed between adjacent ends of said pair of input-to-output pins, with the withdrawal of a portion of said valve means, when said transmission input and output portions are locked in neutral, causing a diverging movement of the input-to-output pin associated with said input shift rail interlock pins, thus unlocking one of said first and second shift rails and permitting an input to said transmission while still maintaining said third and fourth shift rails in a neutral position.

16. In a shift control system in combination with a transmission having a multiple input portion and a multiple output portion, each of which in turn contains a plurality of constant-mesh change speed gears to provide a plurality of drive ratios, a shifting method comprising:
   a. moving the control member of a preselector valve having a plurality of positions, each of which corresponds to a separate one of said drive ratios, to another of said positions;
   b. producing a first signal upon activating a first shift sensing means upon moving said preselector valve control member;
   c. shifting a neutral sequence valve to one of first and second alternate positions in response to said first signal;
   d. actuating one of first and second motor means associated with said transmission input portion to move the one of first and second corresponding input shift rails, that is not in neutral position, to neutral position;
   e. locking said transmission input portion into neutral position;
   f. producing a second signal upon activating a second shift sensing means upon the locking of said input shift rails to neutral position;

g. shifting said neutral sequence valve to another to said first and second alternate positions in response to said second signal;
h. actuating at least one of third and fourth motor means associated with said transmission output portion to move at least one of said third and fourth corresponding output shift rails to neutral and one of said third and fourth output shift rails for coupling a predetermined gear;
i. locking said transmission output portion in said separate one drive ratio;
j. actuating one of said first and second motor means to move one of said first and second input shift rails for coupling a predetermined gear; and
k. simultaneously locking another of said first and second input shift rails in neutral, thereby completing the shift.

17. In a mechanical interlock structure, in combination with a transmission shift control system that includes a plurality of fluid-pressure operated motor means having corresponding shift rails, for actuating a plurality of constant-mesh speed change gears in a transmission to provide a plurality of drive ratios, an interlocking method for said shift rails comprising:
a. in one mode of operation, axially abutting and sliding, in unison, a pair of axially aligned input shift rail interlock pins so that one of said interlock pins coacts with one of a pair of first and second transmission input shift rails, thereby locking one of said input shift rails in neutral;
b. in another mode of operation, axially separating and divergingly sliding said pair of input shift rail interlock pins so that said interlock pins coact with both said first and second shift rails, thereby locking both of said shift rails in neutral;
c. alternately sliding an output shift rail interlock pin so that it coacts with one of a pair of third and fourth transmission output shift rails, thereby locking one of said output shift rails in neutral;
d. in one mode of operation, divergingly sliding one of a pair of axially aligned output shift rail locking pins so that said one locking pin alternately coacts with another of said output shift rails, thereby locking said another output shift rail in gear; and
e. in another mode of operation, axially abutting said pair of axially aligned output shift rail locking pins, thereby unlocking said another output shift rail.

18. The interlocking method of claim 17 further including interposing and coacting an input-to-output interlock means between said shift rail interlock pins and said output shift rail locking pins, thereby preventing the shifting of said third and fourth shift rails until said first and second shift rails are in neutral position and further preventing the shifting of said first and second shift rails out of neutral position until one of said third and fourth shift rails has coupled a predetermined gear.

19. The interlocking method of claim 18 wherein said coacting of said input-to-output interlock means includes alternately forcing apart the abutting ends of one of said pairs of input shift rail interlock pins and said output shift rail locking pins.

20. The interlocking method of claim 19 further including divergingly moving at least a portion of said input-to-output interlock means when said transmission output portion is in neutral, thereby unlocking one of said first and second shift rails, thus permitting an input to said transmission while still maintaining said third and fourth shift rails in a neutral position.

* * * * *